3,527,835
HYDROISOMERIZATION WITH MORDENITE CATALYST PREPARED BY COMPETITIVE CATIONIC EXCHANGE
Hans A. Benesi, Berkeley, Calif., assignor to Shell Oil Company, New York, N.Y., a corporation of Delaware
Filed Jan. 24, 1968, Ser. No. 700,204
Int. Cl. C07c 5/30
U.S. Cl. 260—683.65                                  8 Claims

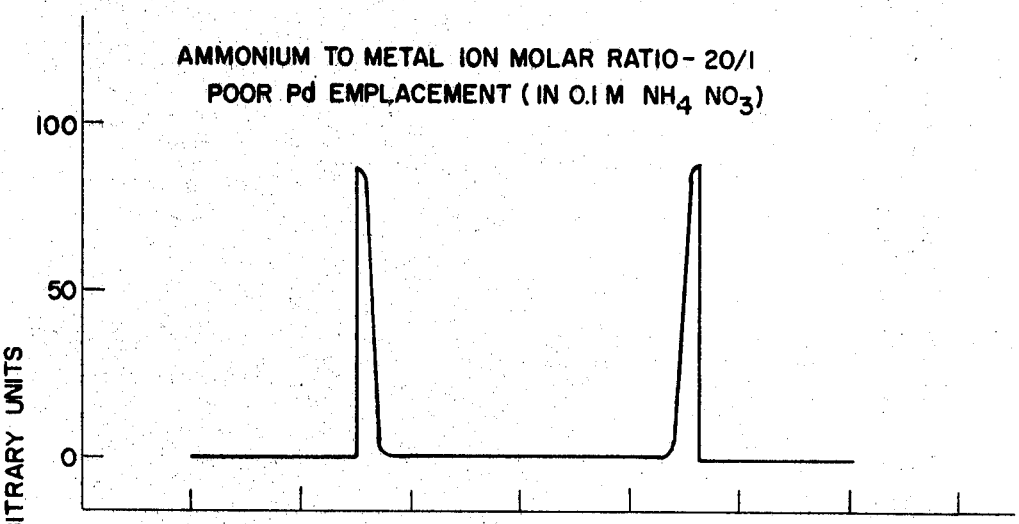
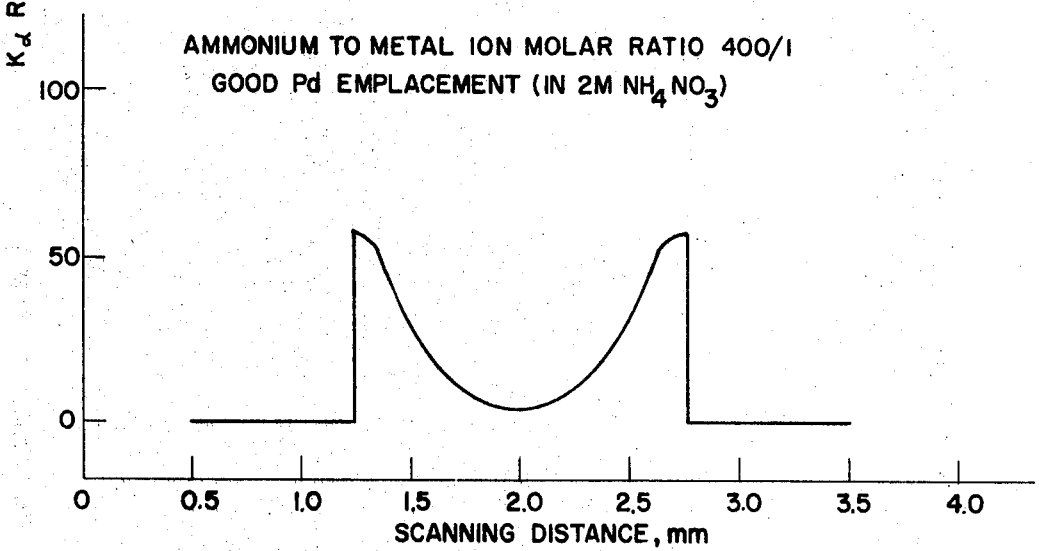
ELECTRON PROBE MEASUREMENTS OF PALLADIUM PROFILE IN MORDENITE EXTRUDATES United States Patent Office 3,527,835
Patented Sept. 8, 1970

ABSTRACT OF THE DISCLOSURE

A method for preparing a paraffin hydroisomerization catalyst containing highly dispersed platinum or palladium homogeneously distributed into a synthetic crystalline alumino-silicate mordenite support. Dispersion of metal throughout the support is achieved by competitive cationic exchange in an ammoniacal solution having an ammonium ion to metal complex ion ratio of about 100 to 1 or more. Dispersion of metal is maintained by controlling the metal reduction temperature. The catalyst thus prepared is used to isomerize normal paraffins in the $C_4$ to $C_7$ range in the presence of hydrogen at elevated temperature and pressure.

BACKGROUND OF THE INVENTION

Field of the invention

This invention relates to catalytic isomerization of low molecular weight normal paraffins. More particularly it relates to a method of preparing a paraffin hydroisomerization catalyst comprising highly dispersed platinum or palladium metal homogeneously distributed into a synthetic crystalline alumino-silicate mordenite support by competititve cationic exchange and the process of hydroisomerization therewith.

Description of the prior art

Catalytic isomerization of low molecular weight paraffins is well known and of significant importance in the petroleum refining industry. To accomplish this reaction, an acidic catalyst is required; early processes relied upon strongly acidic Friedel-Crafts catalysts such as acid promoted aluminum chloride. The use of heterogeneous catalyst is favored for commercial refining processes, however, and various isomerization processes have been developed around the use of acid-acting refractory oxide catalysts. Recently much attention has been directed to the use of crystalline alumina-silicate—known as zeolites or molecular sieves—as hydroconversion catalysts. Due to the high intrinsic acidity of these materials, they have been proposed as isomerization catalysts. The mordenite form of zeolites—particuarly synthetic mordenite—is known as an isomerization catalyst as such and when composited with a noble metal hydrogenation component (see for example, Benesi U.S. 3,190,939 issued June 1965, and Adams et al., U.S. 3,299,153 issued January 1967).

Without noble metal component, the mordenite catalyst promotes excessive hydrocracking, making the catalyst unsuitable in practical refining processes. The addition of noble metal tends to reduce cracking. However, the catalyst previously proposed—even those containing noble metals—still require improvement in the reduction of cracking. Improvements in selectivity to dibranched isomers and in increased process stability is especially important.

The incentive for an efficient refining process for isomerization of n-paraffins is apparent from the following table comparing the octane numbers of n-pentane and n-hexane with their respective isomers.

| Compound: | Research octane No. |
|---|---|
| n-Pentane | 61.7 |
| Isopentane | 92.3 |
| n-Hexane | 34.0 |
| 2-methylpentane | 73.4 |
| 3-methylpentane | 74.5 |
| 2,2-dimethylbutane | 91.8 |
| 2,3-dimethylbutane | 103.5 |

Refining economics are such that the marginal improvement in product value over feed costs will justify only efficient, selective, and relatively inexpensive processes. To be of commercial significance, an isomerization proces must be selective in production of desired isomers and in minimizing cracking to gaseous products. Moreover, since catalyst cost, especially noble metal-containing catalyst is high, the catalyst must have long life and be easily regenerated.

It has now been discovered that homogeneous distribution of finely dispersed platinum or palladium metal into synthetic mordenite is of critical importance in obtaining catalyst stability and selectivity for hydroisomerization. The method of incorporation by competitive ion exchange of metals in the catalyst is a controlling factor in achieving a suitable catalyst for a process of commercial feasibility. The metal reduction conditions are also of importance.

SUMMARY OF THE INVENTION

In broad aspect the invention is a method of preparing a catalyst and a process for catalytic hydroisomerization of paraffin hydrocarbons having from 4 through 7 carbon atoms per molecule in the presence of hydrogen at elevated temperature and pressure, the catalyst comprising platinum or palladium metal incorporated into synthetic mordenite by competitive cationic exchange. The desired cationic exchange is accomplished by contacting mordenite with a solution of platinum or palladium cations together with competing ammonium ions. A ratio of ammonium ion to metal cation of 100 or more is required. In a preferred embodiment the incorporated metal is reduced in hydrogen at a temperature below about 930° F.

The ammonium ions are derived from salts of mineral acids and preferably from ammonium nitrate. Platinum and palladium cations are supplied by various salts and complexes, preferably by an ammine complex compound such as ammoniacal platinum chloride solution.

It is preferred that the synthetic mordenite used in the present invention be in the hydrogen form. The hydrogen form of synthetic mordenite is well known in the art and can be prepared by exchange of alkali metal ions (notably sodium) in the mordenite structure for hydrogen ions (as with an acid) or with ammonium ions which are subsequently thermally decomposed to hydrogen ions.

About 95% and preferably at least 99% of the alkali metal ions are removed by ion exchange. It is also preferred that the mordenite be acid treated prior to exchange of the metal. An especially suitable pretreatment is disclosed in my co-pending application Ser. No. 644,072 filed June 7, 1967.

The crystalline alumino-silicate (mordenite) contemplated for the process of the present invention is characterized by its high silicon to aluminum ratio of above about 5:1 and its crystal structure. The synthetic mordenite is preferred over the natural material. The theoretical composition of mordenite as given in Kirk Othmer, "Encyclopedia of Chemical Technology," vol. 12, page 297, is $(Ca,Na_2)Al_2Si_9O_{22}6H_2O$. However, the material suitable for the present invention does not have the exact theoretical composition and is characterized by a Si/Al ratio in excess of about 5, preferably about 6. The structure is one in which the basic building block is a tetrahedron consisting of one silicon or aluminum atom surrounded by four oxygen atoms. The crystal is made up of chains of four- and five-membered rings of these tetrahedra. These four- and five-membered rings are believed to give the structure its stability. The chains are linked together to form a network having a system of large parallel channels interconnected by small cross channels. Rings of 12 tetrahedra form the large channels. Other synthetic zeolites also have such 12-membered rings, but they have interconnected cages whereas the mordenite has parallel channels of uniform diameter. For example, synthetic faujasite, which has the formula $Na_3Al_3Si_4O_{14}$, is characterized by a three-dimensional array of pores which consist of 12–13° A. cages interconnected through 8–9° A. windows.

A very suitable form of synthetic mordenite is available from the Norton Company under the trade name Zeolon.

Exchange of noble metal cations into synthetic mordenite is known. However, such exchange in the absence of a competing cation results in selective incorporation of the metal on the outside of the mordenite particle. Since the exchange proceeds very rapidly, all the metal is exchanged where it first contacts the mordenite. Thus, the metal is non-homogeneously distributed. The competing ammonium ions retard the exchange of metal and allow diffusion throughout the pore structure. This is especially important in the mordenite structure where the pore structure is in the form of unconnected, long, narrow channels. The metal is dispersed—finely divided to give a large available surface area—by the cationic exchange into the mordenite support. However, even though finely divided, it may be deposited on a relatively small portion—the areas of initial contact—of the support. Competition exchange results in uniform distribution of the finely divided dispersed metal throughout the support.

The noble metal deposited in the ionic form must be reduced to the metallic state to achieve catalytic activity. This is conventionally accomplished by contact with hydrogen at elevated temperature.

It has been found that when the reduction temperature exceeds about 930° F. the dispersion of metal is impaired; the metal tends to agglomerate and extensive loss of available metal surface and a concomitant loss in catalytic activity results. Thus in one aspect the present invention contemplates maintenance of the metal in the dispersed state by control of reduction temperature to below about 930° F. and preferably at about 500° F.

For redispersal, it has been found that contact with an oxygen containing gas at a temperature above about 900° F. is very satisfactory. Any inert gas containing oxygen may be used, but dry air is usually preferred because it is readily available and inexpensive.

The phenomenon of sintering and redispersal will be further illustrated in the examples to point up the critical importance of high metal dispersion for isomerization activity.

To achieve the desired distribution of metal component throughout the mordenite particles, it is essential that a relatively large amount of the competing ammonium ion be used. For cationic exchange into mordenite, small quantities of competing ions have surprisingly been found totally inadequate. Thus the ratio of ammonium ions to metal complex ions should be in the range of about 100 or above. This ratio is the controlling factor in the exchange mechanism; however, from purely practical aspects, the absolute level of ions is also important. With very dilute solutions, a long period of time is required to equilibrate the ions in solution with those exchanged into the mordenite. Thus it is preferred that solutions of about 1 molar with respect to ammonium ions be used. It is especially suitable to use solutions of about 2 molar with respect to ammonium ions.

While the metal cation is preferably in the ammoniated form, it should be noted that they exist is solution as an ammine complex compound. Ammines are defined in The Condensed Chemical Dictionary, Reinhold Pub. Company, 1956, page 68, as "Coordination compounds formed by the union of ammonia with a metallic substance, in such a way that the nitrogen atoms are linked directly to the metal."

The ammonium ions referred to in this specification and the claims are free ammonium ions not complexed with the metal.

The amount of metal incorporated in the catalyst should be at least about 0.02% weight basis finished catalyst and not exceed about 5% weight. It is preferred the metal content be at least about 0.1% weight and not over about 1.5% weight.

The homgeneous distribution of dispersed platinum or palladium metal as contrasted to non-homogeneous distribution has a marked effect on isomerization selectivity—both in production of desired disubstituted isomers and in reduction of cracking. Cracking to lower molecular weight components is significantly reduced when homogeneous distribution is achieved.

This phenomenon may be explained by a consideration of the mechanism of isomerization with solid catalysts. It is widely accepted that isomerization proceeds through an intermediate which is a hydrogen deficient entity, conventionally represented as a carbonium ion, which rearranges and is then converted to the corresponding isoparaffin by hydrogen transfer. Carbonium ions can also form olefins through loss of a hydrogen ion. If the olefin concentration exceeds a critical level, considerable cracking, polymerization, and coke formation occurs in addition to the desired reaction—isomerization. Apparently, the presence of a small amount of hydrogenation metal— such as platinum—lowers the olefin concentration to a negligible level and thus improves selectivity for paraffin isomerization.

Thus when the metal is non-homogeneously distributed on the support, the unprotected sites promote cracking as well as isomerization. Moreover, cracking leads to the formation of coke preferentially inside the pores of the catalyst which not only deactivates the catalytic sites but blocks entrance to the pores which rapidly reduces available catalyst surface. This, of course, is particularly serious in the case of mordenite supports which have relatively narrow parallel unconnected channels.

Feed to an isomerization process using catalysts of the invention can be substantially pure normal paraffins having from 4 through 7 carbon atoms, mixtures of such normal paraffins, or hydrocarbon fractions rich in such normal paraffins. Suitable hydrocarbon fractions are the $C_4$ to $C_7$ straight-run fractions of petroleum.

The process of the invention is conducted at a temperature in the range from about 400° to 650° F. and preferably from about 450° to 600° F. At lower temperatures, conversion of normal paraffins is generally too low to be practical, although selectivity to isoparaffins is substantially 100%. At higher temperatures, conversion of normal paraffins is quite high; however, excessive cracking is encountered and selectivity to isoparaffin is low as a result.

The isomerization reaction can be conducted over a wide range of space velocities, but in general the space velocity is in the range from about 0.5 to 10 and preferably from about 1 to 5. Space velocity, as the term is used herein, refers to WHSV and is expressed as weight of feed per hour per unit weight of catalyst.

The isomerization reaction is carried out in the presence of hydrogen; however, there is little or no net consumption of hydrogen in the process. Any consumption of hydrogen is the result of hydrocracking reactions and it is preferred to keep such reactions to a minimum. The function of the hydrogen is primarily to improve catalyst life, apparently by preventing polymerization of intermediate reaction products which would otherwise polymerize and deposit on the catalyst. A hydrogen to hydrocarbon mole ratio of from about 1:1 to 25:1 and preferably from about 2:1 to 15:1 is used. It is not necessary to employ pure hydrogen since hydrogen-containing gases, e.g., hydrogen-rich gas from the catalytic reforming of naphthas, are suitable. Total pressure is in the range from about atmospheric to 1000 pounds per square inch gauge (p.s.i.g.) and preferably from about 300 to 750 p.s.i.g.

The attached drawing is a graphical illustration of experimental data for palladium distribution into mordenite pellets and will be fully discussed in Example I.

The following examples are included to further demonstrate the practice and advantages of the invention and should not be taken as limiting.

EXAMPLE I

Experiments were conducted which illustrate the advantages of competitive ion exchange of noble metal into synthetic mordenite. The mordenite used was obtained from the Norton Company under the trade name Zeolon.

Initial preparations of palladium supported on synthetic mordenite extrudates were unsatisfactory because it was found that the palladium had been totally deposited in the outer 0.1 mm. layer of the extruded pellet. In the case of these preparations, the palladium had been ion-exchanged at 77° F. by overnight contact of the extrudate with a solution that was 0.005 M with respect to ammoniacal palladium chloride and 0.1 M with respect to ammonium nitrate (ammonium to metal ion ratio—20/1). Ion-exchanging at 212° F. instead of at 77° F. did not broaden the palladium layer. A more uniform distribution of palladium was obtained by increasing the concentration of ammonium nitrate from 0.1 to 1.0 M during the ion-exchange step (ammonium to metal ion ratio—200/1). The brown color of the palladium in the calcined product was only slightly less intense in the center of the extruded pellets than in the outer portion. The use of 2.0 rather than 1.0 M ammonium nitrate appeared to give an even more uniform palladium distribution.

Quantitative measurements of palladium distributions within the above-described Pd-mordenite pellets were made by scanning along the diameter of polished cross-sections of such pellets by means of an electron microprobe. The resulting metal profiles verified that palladium distribution was more uniform when a 2 M (FIG. B—ammonium to metal ion ratio 400/1) rather than an 0.1 M (FIG. A—ammonium to metal ratio 20/1) ammonium nitrate solution was used during the ion-exchange step. The results are compared in the attached drawing.

It was also noted in the electron probe measurements that aluminum distribution in the mordenite pellets varied similarly to the distribution of palladium, the aluminum content decreasing toward the center of the pellet. Apparently this was due to leaching of the aluminum by acid pretreatment from amorphous material in the center of the pellet. Thus the metal distribution is even more uniform—basis crystalline mordenite—than would appear from the data presented.

EXAMPLE II

The effect of palladium distribution on catalytic behavior for n-hexane isomerization is illustrated in Table 1. These results show that the mordenite catalyst with a uniform palladium distribution produces less hydrocracked products than that having a non-uniform palladium distribution. This result is obtained despite the fact that the catalyst which has uniform distribution contains less palladium which would be expected to increase cracking relative to a catalyst of higher palladium content. These results are consistent with other tests showing that extensive hydrocracking of n-hexane occurs when mordenite is "unprotected" by a noble metal such as platinum or palladium as will be illustrated in Example III.

TABLE 1.—ISOMERIZATION OF n-HEXANE OVER Pb/MORDENITE AT 500° F.; EFFECT OF PALLADIUM DISTRIBUTION

WHSV=6
Pressure=450 p.s.i.g.
H₂ to Feed Ratio=2.5/1

| Pd content, percent weight | Type of Pd distribution | n-Hexane conversion, percent a | Products, percent weight | | |
|---|---|---|---|---|---|
| | | | C₁–C₄ | C₅'s | i-C₆'s |
| 0.92 | Non-uniform b | 25.8 | 1.2 | 0.6 | 24.0 |
| 0.52 | Uniform c | 24.6 | 0.2 | 0.1 | 24.3 | a Average conversion over 2-hour test period.
b Palladium added as ammoniacal palladium chloride in the presence of 0.1 M ammonium nitrate.
c Palladium added as ammoniacal palladium chloride in the presence of 2 M ammonium nitrate.

EXAMPLE III

That the presence of even a low concentration of a hydrogenation metal such as platinum can greatly promote the isomerization of n-hexane over mordenite is shown by the results in Table 2. The 0.1% weight Pt/mordenite sample was prepared by exchanging tetrammine platinous ion with the ammonium form of mordenite. This product and a sample of the original ammonium form were calcined at 1022° F. to produce the catalysts listed. It can be seen that the presence of platinum greatly increases hexane conversion and improves selectivity for the production of iso-hexanes.

TABLE 2.—ISOMERIZATION OF n-HEXANE OVER MORDENITE AT 572° F.

WHSV=6
Pressure=600 p.s.i.g.
Molar Ratio of Hydrogen to Feed=5 to 1
Process Time=2 hrs.

| Catalyst | n-Hexane conversion, percent | Cracking (C₁–C₅), percent weight of converted products | Isomerization, percent weight of converted products |
|---|---|---|---|
| Mordenite | 12.0 | 64.2 | 32.5 |
| 0.1 percent weight Pt/mordenite | 44.0 | 29.3 | 70.7 |

EXAMPLE IV

In tests of the effects of catalyst pretreatments of isomerization activity and selectivity of metal-promoted mordenite, it was found that heating the catalyst in hydrogen at atmospheric pressure at 932° F. for 30 minutes resulted in increased hydrocracking of n-hexane to C₁–C₅ paraffins (see Table 3). However, this enhanced cracking activity could be removed by heating the resulting catalyst in air at 1022° F. for 30 minutes. This phenomenon indicated that the metal promoter had been sintered in hydrogen at 932° F., but that the metal was subsequently redispersed by air calcination.

TABLE 3.—n-HEXANE ISOMERIZATION OVER MORDENITE CATALYSTS

Temp.=500° F.
WHSV=1
Pressure=450 p.s.i.g.
H$_2$/Feed ratio=2.5/1
Process Period=2 hours

| Content metal content, percent weight | Pretreatment | n-Hexane conv., percent | Products, percent weight | | H/Pd atomic ratio |
|---|---|---|---|---|---|
| | | | C$_1$-C$_5$ | 2,2-DMB a | |
| 0.08 Pt | H$_2$ at 500° F | 51.5 | 1.2 | 5.6 | |
| | H$_2$ at 932° F | 71.1 | 17.4 | 8.1 | |
| 0.66 Pd | H$_2$ at 500° F | 60.0 | 1.4 | 7.1 | 0.77 |
| | H$_2$ at 932° F | b 65.9 | 13.4 | 6.5 | 0.12 |
| | Air at 1,022° F | b 54.1 | 1.1 | 5.1 | 0.90 | a 2,2 dimethylbutane.
b These tests carried out successively on the same catalyst sample.

Hydrogen chemisorption measurements carried out by means of a chromatographic flow technique verified that the dispersion of palladium was indeed strongly affected by the pretreatment the catalyst had received. The resulting atomic ratio of chemisorbed hydrogen to palladium listed in the last column of Table 3 show that palladium is sintered in hydrogen, then redispersed by air calcination.

EXAMPLE V

To test the effect of metal type and concentration, several promoted mordenite catalysts were prepared. Three forms of mordenite were used: 1/16 inch extrudate, 1/8 inch extrudate, and "ultrapure" powder—all from Norton Company. In each case, the mordenite base was digested in boiling 2 N HCl for two hours and then equilibrated with a dilute solution of palladium or platinum ammine chloride in the presence of 1 to 2 M ammonium nitrate. The products were calcined overnight at 1022° F.

Isomerization of n-hexane under standardized conditions was again used as a test reaction to compare the above catalyst preparations. The results, which are listed in Table 4, show that the metal-promoted catalysts do not differ greatly in activity. The most active catalyst is that prepared from Norton's "ultrapure" powder. The first five tests listed in Table 4 illustrate the effect of incorporating a noble metal at various levels on a given mordenite support. Note the remarkable increase in selectivity when as little as 0.02% Pd is incorporated in the mordenite support.

EXAMPLE IV

A palladium/mordenite catalyst prepared as described in Example V was compared with other known hydroisomerization catalysts for n-hexane isomerization; a commercial catalyst obtained from Linde Company (SK-100 catalyst) which consisted of palladium on "Y" form of faujasite (a crystalline alumino-silicate) and a catalyst consisting of platinum and fluoride supported on amorphous silica-alumina.

The results are shown in Table 5.

TABLE 5.—CATALYTIC ISOMERIZATION OF n-HEXANE

WHSV=6
Pressure=450 p.s.i.g.
H$_2$ to Feed Ratio=2.5 to 1
DMB=Dimethylbutane
MP=Methylpentane
MCP=Methylcyclopentane
CH=Cyclohexane

| Catalyst | Temp., °F. | Conv., percent | Products, percent weight | | | | | |
|---|---|---|---|---|---|---|---|---|
| | | | C$_1$-C$_5$ | 2,2-DMB | 2-MP plus 2,3-DMB | 3-MP | MCP | CH |
| Pd/mordenite | 500 | 24.8 | 0.4 | 1.6 | 14.7 | 7.7 | 0.3 | .1 |
| Pd/"Y" faujasite | 608 | 26.5 | .3 | .7 | 15.2 | 9.8 | .4 | .1 |
| Pt/F/silica-alumina | 644 | 23.3 | .3 | .3 | 13.2 | 9.0 | .4 | .1 |

The activity (indicated by temperature) and selectivity to 2,2-dimethylbutane is markedly better for the mordenite catalyst. Formation of 2,2-dimethylbutane is a good indicator of catalyst selectivity since it is known that this isomer is the most difficult to produce.

I claim as my invention:

1. A method of preparing hydroisomerization catalyst containing a platinum metal highly dispersed and homogeneously distributed into crystalline mordenite which comprises ion-exchanging a synthetic mordenite having a silicon to aluminum ratio in excess of about 5 with a solution of cationic metal selected from a group consisting of platinum and palladium in the presence of excess ammonium ions, said solution having a ratio of ammonium ions to metal cations in excess of about 100:1, drying, calcining and reducing the catalyst at elevated temperature.

2. The method of claim 1 wherein the cationic metal ammonium concentration of the solution is about 1 molar or higher.

3. The method of claim 1 wherein the metal is reduced at a temperature not exceeding about 930° F.

4. A hydroisomerization catalyst comprising a metal selected from the group consisting of platinum and pal-

TABLE 4.—HEXANE ISOMERIZATION OVER MORDENITE CATALYSTS AT 500° F.

WHSV=1
Pressure=450 p.s.i.g.
H$_2$/Feed Ratio=2.5 to 1.
Process Period=2 hrs.

| Starting material | Noble metal content, percent weight | n-Hexane conv., percent | Products, percent weight | | | | |
|---|---|---|---|---|---|---|---|
| | | | C$_1$-C$_4$ | C$_5$'s | 2,2-DMB a | 2-MP b + 2,3-DMB a | 3-MP b |
| 1/16" Extrudate | None | 34.2 | 7.0 | 3.7 | 3.0 | 13.8 | 6.6 |
| Do | 0.02 Pd | 44.4 | 0.6 | 0.3 | 5.3 | 25.3 | 12.6 |
| Do | .66 Pd | 60.1 | .9 | .5 | 7.4 | 34.3 | 16.8 |
| Do | .08 Pt | 51.5 | .8 | .4 | 5.6 | 29.3 | 15.0 |
| 1/8" Extrudate | .49 Pd | 66.0 | .9 | .6 | 6.3 | 38.6 | 19.4 |
| Do | .51 Pt | 67.7 | 2.5 | .9 | 6.9 | 37.9 | 19.2 |
| Ultra-pure powder | .55 Pd | 68.6 | 1.7 | .9 | 10.4 | 36.8 | 18.3 |
| Thermodynamic equilibrium | | 83.0 | | | 21.0 | 41.5 | 20.5 | a Dimethylbutane.   b Methylpentane.

ladium, dispersed and distributed into synthetic mordenite having a silicon to aluminum ratio in excess of about 5, prepared by exchange of metal cations from a cationic solution of metal containing an excess of ammonium ions, said solution having a ratio of ammonium ion to metal cation in excess of about 100:1 and reduction of the metal ions with hydrogen at a temperature not in excess of about 930° F.

5. A process for hydroisomerization of paraffins having from 4 to 7 carbon atoms per molecule at elevated temperature and pressure in the presence of hydrogen and a catalyst comprising a metal selected from the group consisting of platinum and palladium highly dispersed and homogeneously distributed into a synthetic mordenite support having a silicon to aluminum ratio in excess of about 5, the metal being dispersed and distributed into the mordenite by competitive cationic exchange from a solution of metal ions and ammonium ions, the ratio of ammonium ions to metal ions being above about 100:1.

6. The process of claim 5 wherein the metal is reduced with hydrogen prior to use at a temperature not in excess of about 930° F.

7. The process of claim 5 wherein the metal is maintained in the dispersed form by periodic calcination in an oxygen-containing gas at a temperature of about 930° F.

8. The process of claim 5 wherein the temperature is in the range of from about 400° F. to 650° F., the pressure is in the range of about 0 to 1000 p.s.i.g. and the hydrogen to hydrocarbon mole ratio is in the range of from about 1:1 to 25:1.

References Cited

UNITED STATES PATENTS

| | | | |
|---|---|---|---|
| 3,275,571 | 9/1966 | Mattox | 252—453 |
| 3,280,212 | 10/1966 | Miale et al. | 260—683.65 |
| 3,299,153 | 1/1967 | Adams et al. | 260—683.65 |
| 3,393,156 | 7/1968 | Hansford | 252—460 |
| 3,442,794 | 5/1969 | Van Helden et al. | 260—683.65 |

DELBERT E. GANTZ, Primary Examiner

G. J. CRASANAKIS, Assistant Examiner

U.S. Cl. X.R.

252—460